US012428129B2

(12) United States Patent
Yasui

(10) Patent No.: US 12,428,129 B2
(45) Date of Patent: Sep. 30, 2025

(54) JOINT STRUCTURE AND MANUFACTURING METHOD THEREOF

(71) Applicant: NABTESCO CORPORATION, Tokyo (JP)

(72) Inventor: Tsutomu Yasui, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 593 days.

(21) Appl. No.: 17/892,914

(22) Filed: Aug. 22, 2022

(65) Prior Publication Data

US 2023/0061901 A1 Mar. 2, 2023

(30) Foreign Application Priority Data

Aug. 30, 2021 (JP) ................. 2021-140372

(51) Int. Cl.
*B64C 9/02* (2006.01)
(52) U.S. Cl.
CPC ..................... *B64C 9/02* (2013.01)
(58) Field of Classification Search
CPC ....... F16C 7/00–08; B64C 13/24; B64C 9/02; B64C 70/86; B64C 70/462
See application file for complete search history.

(56) References Cited

U.S. PATENT DOCUMENTS

| 4,704,918 A | 11/1987 | Orkin |
| 5,039,470 A | 8/1991 | Bezin et al. |
| 5,181,732 A | 1/1993 | Bezin et al. |
| 5,556,081 A * | 9/1996 | Miura ..................... B29C 70/86 |
| | | 267/47 |
| 5,651,513 A * | 7/1997 | Arena ....................... B64C 9/16 |
| | | 244/99.3 |
| 6,116,113 A * | 9/2000 | Pazdirek ................ H01B 17/14 |
| | | 57/230 |

(Continued)

FOREIGN PATENT DOCUMENTS

| DE | 889869 C | 9/1953 |
| JP | 2-77388 A | 3/1990 |

(Continued)

OTHER PUBLICATIONS

Notice of Reasons for Refusal dated Apr. 30, 2025, issued in corresponding Japanese Patent Application No. 2021-140372 with English translation (9 pgs.).

(Continued)

*Primary Examiner* — Thomas C Diaz
(74) *Attorney, Agent, or Firm* — Pillsbury Winthrop Shaw Pittman, LLP

(57) ABSTRACT

A joint structure includes a bent portion, a first member configured to be connected rotatably to a mating member, a second member configured to be connected rotatably to an actuator for driving the mating member, and a core shaft. The core shaft has a first connecting portion and a second connecting portion. The core shaft is connected to the first member at the first connecting portion and connected to the second member at the second connecting portion. The joint structure further includes a covering member covering the first connecting portion and the second connecting portion. The bent portion is provided at a position different from the first connecting portion.

6 Claims, 17 Drawing Sheets

(56) References Cited

U.S. PATENT DOCUMENTS

| | | | | |
|---|---|---|---|---|
| 6,152,433 A | * | 11/2000 | Hettich | B60G 7/001 |
| | | | | 180/352 |
| 6,231,264 B1 | * | 5/2001 | McLaughlin | F16C 11/0614 |
| | | | | 403/135 |
| 6,324,940 B1 | | 12/2001 | Pazdirek et al. | |
| 6,379,763 B1 | * | 4/2002 | Fillman | F16C 7/026 |
| | | | | 428/36.9 |
| 6,564,675 B1 | * | 5/2003 | Jiang | B62K 19/16 |
| | | | | 74/594.1 |
| 8,376,271 B2 | | 2/2013 | Saito | |
| 8,678,694 B2 | | 3/2014 | Itoh | |
| 9,546,678 B2 | | 1/2017 | Wu | |
| 10,493,703 B2 | | 12/2019 | Yasui | |
| 11,519,454 B2 | | 12/2022 | Baird | |
| 11,668,339 B2 | | 6/2023 | Yasui | |
| 2023/0061901 A1 | | 3/2023 | Yasui | |

FOREIGN PATENT DOCUMENTS

| | | | | |
|---|---|---|---|---|
| JP | H05208427 A | * | 8/1993 | B29C 45/14 |
| JP | 9-42266 A | | 2/1997 | |

OTHER PUBLICATIONS

Notice of Reasons for Refusal dated Apr. 30, 2025, issued in corresponding Japanese Patent Application No. 2021-140373 with English translation (7 pgs.).

Non-final Office Action dated Feb. 3, 2025, issued in corresponding U.S. Appl. No. 17/893,763 (11 pgs.).

\* cited by examiner

JOINT STRUCTURE AND MANUFACTURING METHOD THEREOF

CROSS-REFERENCE TO RELATED APPLICATIONS

This application is based on and claims the benefit of priority from Japanese Patent Application Serial No. 2021-140372 (filed on Aug. 30, 2021), the contents of which are hereby incorporated by reference in its entirety.

TECHNICAL FIELD

The present disclosure relates to a joint structure and a manufacturing method thereof.

BACKGROUND

In a composite link described in U.S. Pat. No. 6,324,940 ("the '940 Patent"), a fitting is fixed on each end of the tube having a square cross section, and resin impregnated fiber is wound over the end fittings and tube.

The joint structures including the composite link described in the '940 Patent all have a straight hollow tube. Whereas when the hollow tube is bifurcated in a U-shape, a covering member such as the resin impregnated fiber may form creases. Therefore, there is a demand for a joint structure on which creases are less likely to be formed.

SUMMARY

One aspect of the disclosure provides a joint structure. The joint structure includes: a bent portion, a first member configured to be connected rotatably to a mating member; a second member configured to be connected rotatably to an actuator for driving the mating member; a core shaft having a first connecting portion and a second connecting portion, the core shaft being connected to the first member at the first connecting portion and connected to the second member at the second connecting portion; and a covering member covering the first connecting portion and the second connecting portion. The bent portion is provided at a position different from the first connecting portion.

Another aspect of the disclosure provides a method of manufacturing a joint structure. The joint structure includes: a first member configured to be connected rotatably to a mating member; a first member configured to be connected rotatably to a mating member; a core shaft having a first end portion and a second end portion, and a covering member covering the first connecting portion and the second connecting portion. The method includes: covering the core shaft with the covering member; after the covering, connecting the first member to the first end portion and connecting the second member to the second end portion; placing the first member, the core shaft, and the second member on a jig and bending the core shaft at a position different from the first portion; and heating the covering member to cure.

DESCRIPTION OF THE EXEMPLARY EMBODIMENTS

An embodiment of a flight control surface drive device including a joint structure will be described with reference to FIGS. 1 to 18. Note that, in FIGS. 1 and 2, some part of a connecting structure between the flight control surface drive device and a flight control surface may be omitted for convenience.

Figure 1:
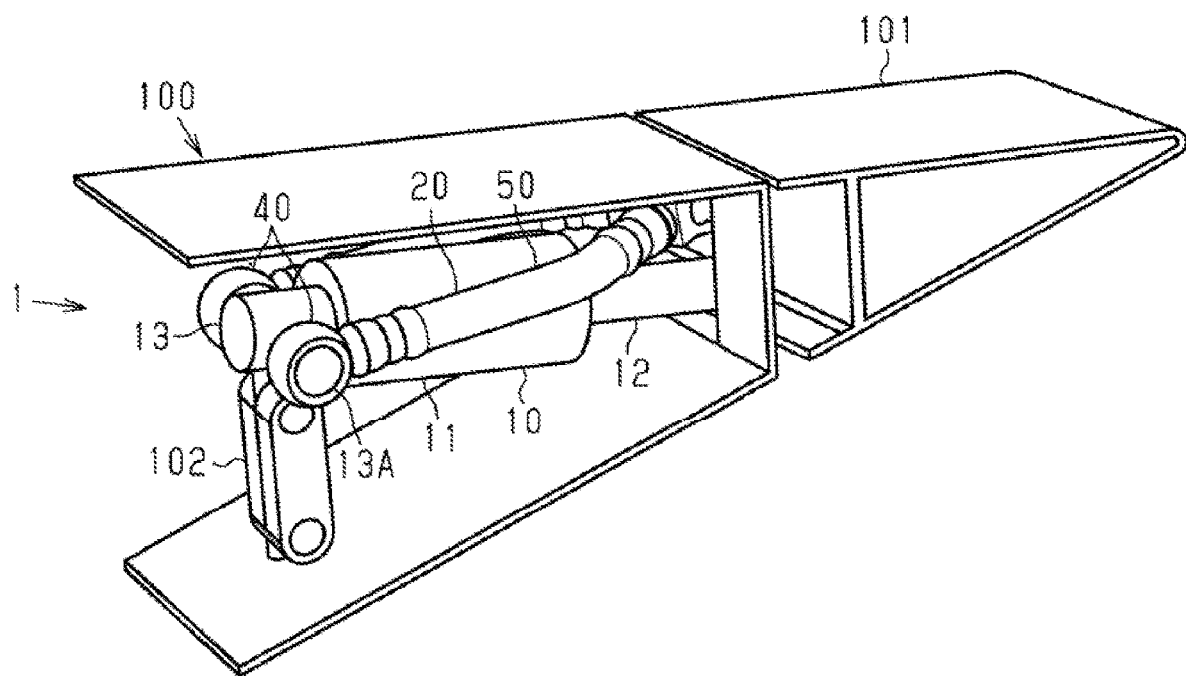
FIG. 1 is a perspective view of a part of a wing having a flight control surface drive device related to an embodiment installed thereon.

As shown in FIG. 1, a flight control surface drive device 1 is provided on a wing 100 of an aircraft. The flight control surface drive device 1 drives a flight control surface 101 of the wing 100 of the aircraft. The flight control surface 101 may include an aileron, a rudder, an elevator, or other control surfaces of aircrafts. The flight control surface driven by the flight control surface drive device 1 may includes a flap, a spoiler and the like.

The flight control surface drive device 1 includes an actuator 10 and a reaction link 20. The actuator 10 drives the flight control surface 101. The reaction link 20 supports a reaction force from the flight control surface 101 when the flight control surface 101 is driven by the actuator 10. The reaction link 20 may be an example of aircraft reaction links. The reaction link 20 is a joint structure in which a plurality of members are joined to each other.

Figure 2:
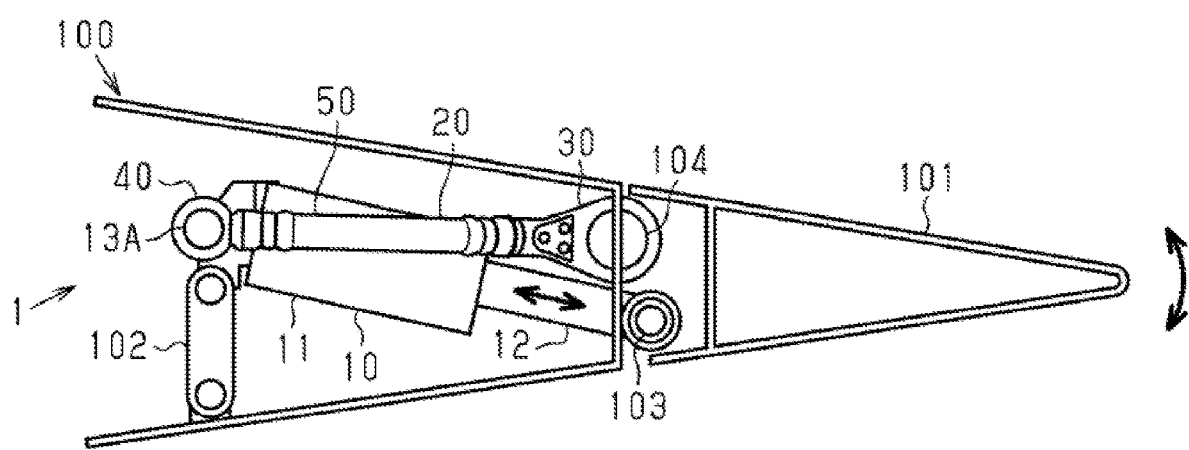
FIG. 2 is a side view of the driving unit related to the embodiment.

As shown in FIG. 2, the actuator 10 rotates the flight control surface 101 relative to the wing 100. The wing 100 has a support portion 102. The flight control surface 101 has a connection shaft 103. The actuator 10 is connected to the support portion 102 and the connection shaft 103. The flight control surface 101 has a fulcrum shaft 104. The fulcrum shaft 104 supports the flight control surface 101 rotatably relative to the wing 100. The actuator 10 causes the flight control surface 101 to rotate about the fulcrum shaft 104. The actuator 10 is a hydraulic linear actuator. The actuator 10 includes a cylinder 11 and a rod 12. When a hydraulic oil is supplied to and drained from the cylinder 11, the rod 12 reciprocates in the axial direction thereof. The actuator 10 may also be an electromechanical linear actuator including an electric motor and a ball screw mechanism. A distal end of a rod 12 is rotatably connected to the connection shaft 103. That is, the actuator 10 is directly connected to the flight control surface 101. Alternatively, the distal end of the rod 12 may be connected to a horn arm (not shown) connected to the flight control surface 101. That is, the actuator 10 may also be indirectly connected to the flight control surface 101. Here, the flight control surface 101 corresponds to a mating member. The fulcrum shaft 104 corresponds to a rotation shaft.

As shown in FIG. 1, the actuator 10 includes a connecting portion 13. The connecting portion 13 is provided on a side of the cylinder 11 opposite to a side thereof from which the rod 12 protrudes. The connecting portion 13 is connected with the support portion 102. The connecting portion 13 may include a shaft 13A extending orthogonally to the axis of the rod 12. The reaction link 20 is connected with the shaft 13A.

The reaction link 20 is rotatably connected to the fulcrum shaft 104 and the shaft 13A of the connecting portion 13. When the actuator 10 drives the flight control surface 101, the reaction link 20 may prevent the load applied on the flight control surface 101 from directly impacting the stationary wing 100.

Next, a description is given of an operation of the flight control surface drive device 1.

A hydraulic system (not shown) for supplying a hydraulic oil to the actuator 10 in accordance with instructions from a flight controller (not shown) is provided. The hydraulic oil may be supplied to and drained from the cylinder 11 of the actuator 10 as the hydraulic system works. This causes the rod 12 to protrude from or retract into the cylinder 11 as shown in FIG. 2, and thus the flight control surface 101 connected to the rod 12 via the connection shaft 103 turns about the fulcrum shaft 104. The reaction link 20 supports the shaft 13A rotatably. The reaction link 20 receives, from the flight control surface 101, a reaction force generated when the flight control surface 101 is driven by the actuator 10.

Next, the constitution of the reaction link 20 will now be described with reference to FIGS. 2 to 9.

Figure 3:
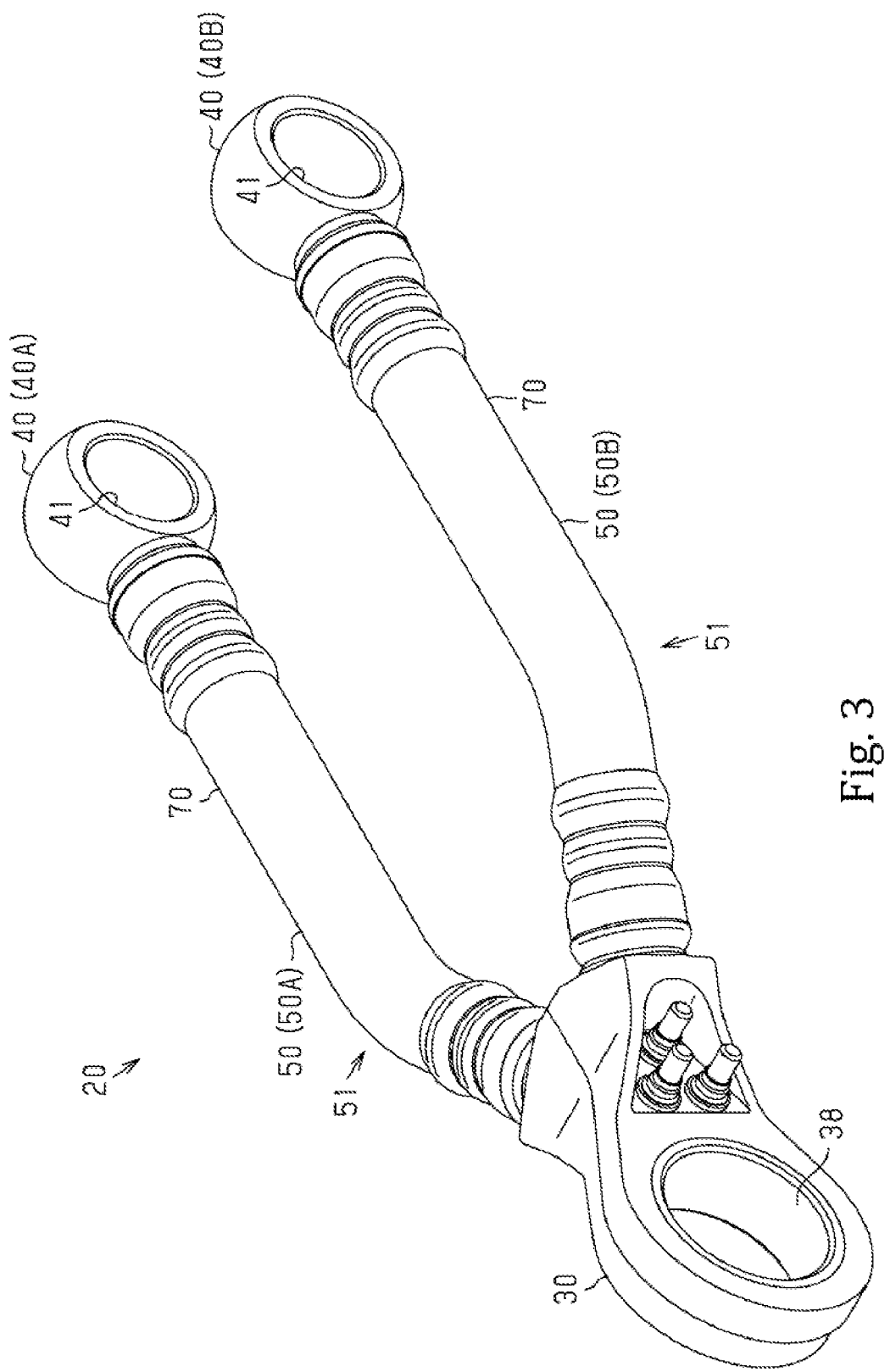
FIG. 3 is a perspective view of a joint structure related to the embodiment.

Referring to FIGS. 2 and 3, the reaction link 20 includes a head 30, a pair of bushes 40, and a pair of link main bodies 50. The head 30 is rotatably connected to the fulcrum shaft 104. The head 30 has a through hole portion 38 through which the fulcrum shaft 104 penetrates. The bushes are rotatably connected to the actuator 10. The bushes 40 each have a through hole 41 through which the shaft 13A penetrates. The link main body 50 connects the head 30 and the bush 40. The head 30 corresponds to a first member. The bush 40 corresponds to a second member.

Figure 4:
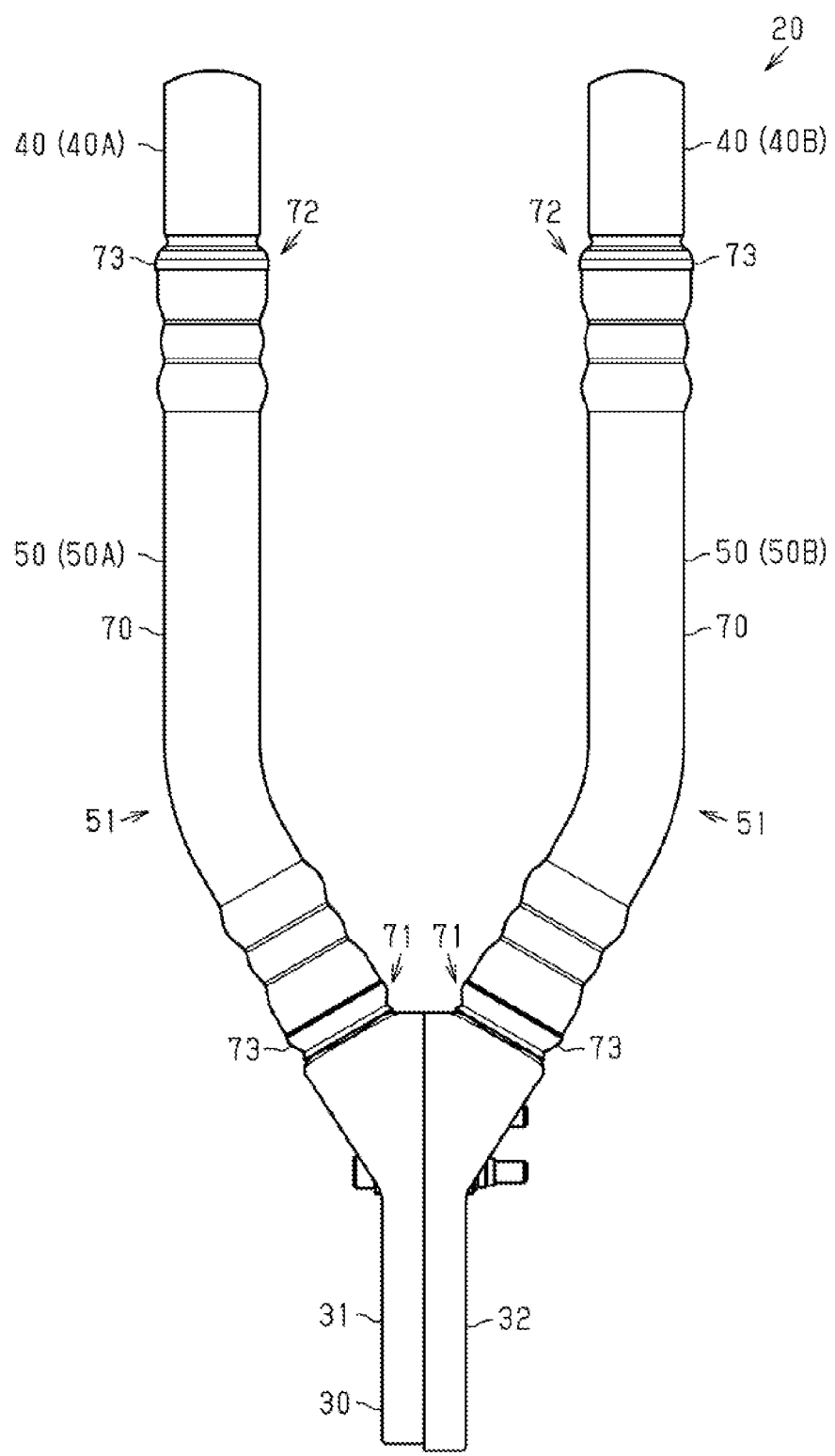
FIG. 4 is a plan view of the joint structure related to the embodiment.
Figure 5:
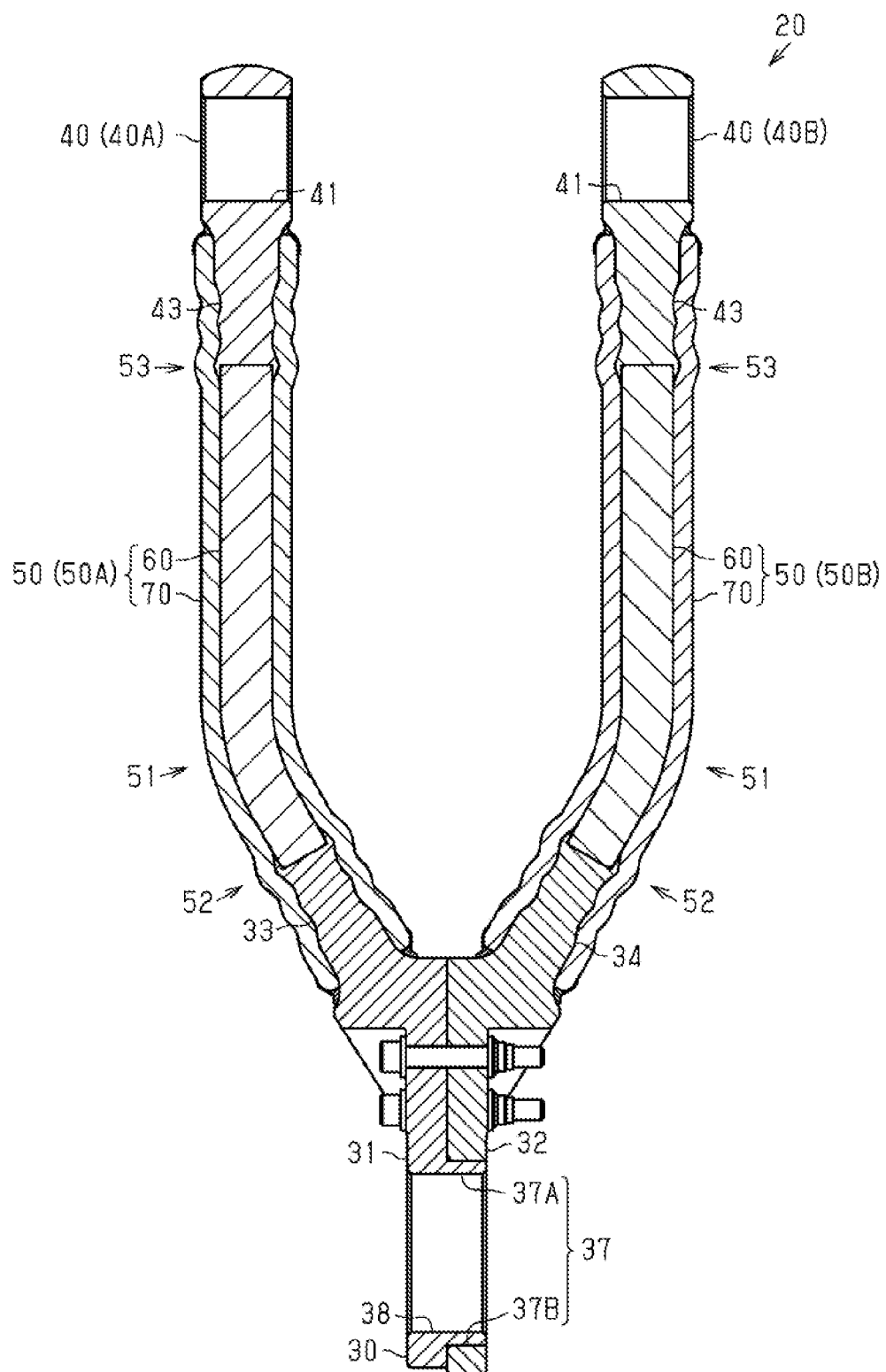
FIG. 5 is a sectional view of the joint structure related to the embodiment.

As shown in FIGS. 4 and 5, the reaction link 20 has a bifurcated Y-shape and includes the pair of bushes 40 and the pair of link main bodies 50. The bush 40 on the left side in the drawing is referred to as a first bush 40A, and the bush 40 on the right side in the drawing is referred to as a second bush 40B. The link main body 50 on the left side in the drawing is referred to as a first link main body 50A, and the link main body 50 on the right side in the drawing is referred to as a second link main body 50B. The first bush 40A is connected to the first link main body 50A. The second bush 40B is connected to the second link main body 50B. The reaction link 20 has a bent portion 51 in the link main body 50. A portion of the first link main body 50A and a portion of the second link main body 50B from the bent portion 51 to the bush 40 extend in parallel to each other. The actuator 10 is disposed between the first link main body 50A and second link main body 50B (see FIG. 1). The shape of the reaction link 20 may be a J-shape instead of the Y-shape. When the shape of the reaction link 20 is the J-shape, the reaction link 20 includes a single bush 40 and a single link main body 50.

The link main body 50 includes a core shaft 60 and a covering member 70. The core shaft 60 connects the head 30 and the bush 40. The core shaft 60 is a cylindrical member. An end portion of the core shaft core 60 preferably has a cylindrical shape, but portions of the core shaft 60 other than the end portion may not be cylindrical. The covering member 70 covers a first connecting portion 52 between the head 30 and the core shaft 60 and a second connecting portion 53 between the bush 40 and the core shaft 60. The covering member 70 covers the core shaft 60 in addition to the first connecting portion 52 and the second connecting portion 53.

The covering member 70 is made of a fiber reinforced plastic (FRP: Fiber Reinforced Plastics). Preferably, the covering member 70 is made of carbon fiber reinforced plastic (CFRP: Carbon Fiber Reinforced Plastics). Usable carbon fibers may include PAN-based carbon fibers and pitch-based carbon fibers. It may also be possible that the covering member 70 is made of, e.g., a glass fiber-reinforced plastic (GFRP), a glass-mat reinforced thermoplastic (GMT), a boron fiber-reinforced plastic (BFRP), an aramid fiber-reinforced plastic (AFRP, KFRP), a Dyneema fiber-reinforced plastic (DFRP), a Xyron-reinforced plastic (ZFRP), etc. Further, it may also be possible to use a fiber-reinforced plastic including a plurality of types of fibers combined together or to use a plurality of types of fiber-reinforced plastics combined together to make the covering member 70.

The covering member 70 is a tow made of the same material and constituted by a bundle of fiber bundles (filaments) including a large number of monofilaments. In addition, it may also be possible that the covering member 70 is a monofilament, a filament, a staple yarn produced by staple spinning, or a braid or a knitted cord including tows. The covering member 70 is provided in layers by wrapping around the outer surfaces of the core shaft 60, the first connecting portion 52, and the second connecting portion 53. The covering member 70 is wound in different directions.

The material of the head 30 or the bush 40 is different from the material of the core shaft 60. That is, the core shaft core 60 is formed of a different material from the material of the head 30 and the material of the bush 40. The head 30 and the bush 40 are made of, for example, a metal material. As the metal material used for the head 30 and the bush 40, a titanium alloy, chrome-molybdenum steel, nickel-chrome-molybdenum steel, stainless steel, and any other known metal materials can be used. The head 30 and the bush 40 may be made of a material other than the metal material. For example, the head 30 and the bush 40 may be made of a ceramic material, a fiber-reinforced plastic such as CFRP, or any other resin materials. The core shaft 60 is formed of a thermoplastic resin such as a polymer plastic so that the core shaft becomes deformable and can be bent. As discussed above, the head 30 or the bush 40 is made of a material different from that of the core shaft 60. Any other resin materials or metal materials in addition to the polymer plastic may be used for the core shaft 60.

The head 30 bifurcates. The head 30 includes a first arm portion 33 and a second arm portion 34 to which the core shafts 60 and the bushes 40 are connected. The head 30 has a first portion 31 including the first arm portion 33 and a second portion 32 including the second arm portion 34. The first portion 31 and the second portion 32 are separable from each other. The first arm portion 33 is connected to the first link main body 50A. The second arm portion 34 is connected to the second link main body 50B. The head 30 is fixed to the core shaft 60 with the covering member 70, and also fixed to the bush 40 with the covering member 70. Here, by providing the bifurcated portion in the head 30 of the reaction link 20, the curvature of the link main body 50 is reduced. Consequently, it is possible to prevent the covering member 70 from creasing due to the bend.

A fitting structure is provided at a joining portion 37 between the first portion 31 and the second portion 32 of the head 30. The fitting structure is a structure in which one of the first portion 31 or the second portion 32 of the head 30 is fitted into the other. The head 30 is configured such that the fulcrum shaft 104 provided in the actuator 10 penetrates the head 30. The joining portion 37 is provided in a through-hole portion 38 through which the fulcrum shaft 104 penetrates. Due to the fitting structure, only one of the first portion 31 or the second portion 32 contacts the fulcrum shaft 104 which is the rotation shaft. Of the head 30, only the first portion 31 comes into contact with the fulcrum shaft 104. The joining portion 37 includes a joining convex portion 37A and a joining concave portion 37B. The joining convex portion 37A is provided in the first portion 31. The joining concave portion 37B is provided in the second portion 32, and the joining convex portion 37A contacts the joining concave portion 37B. A bearing may be provided between the fulcrum shaft 104 and the joining portion 37.

Figure 6:
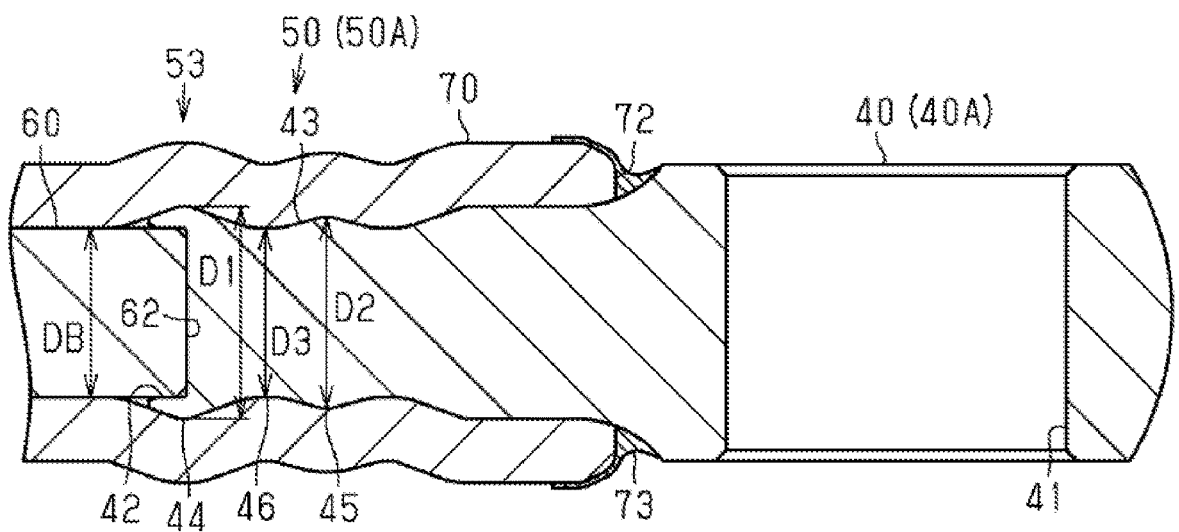
FIG. 6 illustrates a connecting portion between a second member on the left side of the joint structure related to the embodiment and a core shaft.
Figure 7:
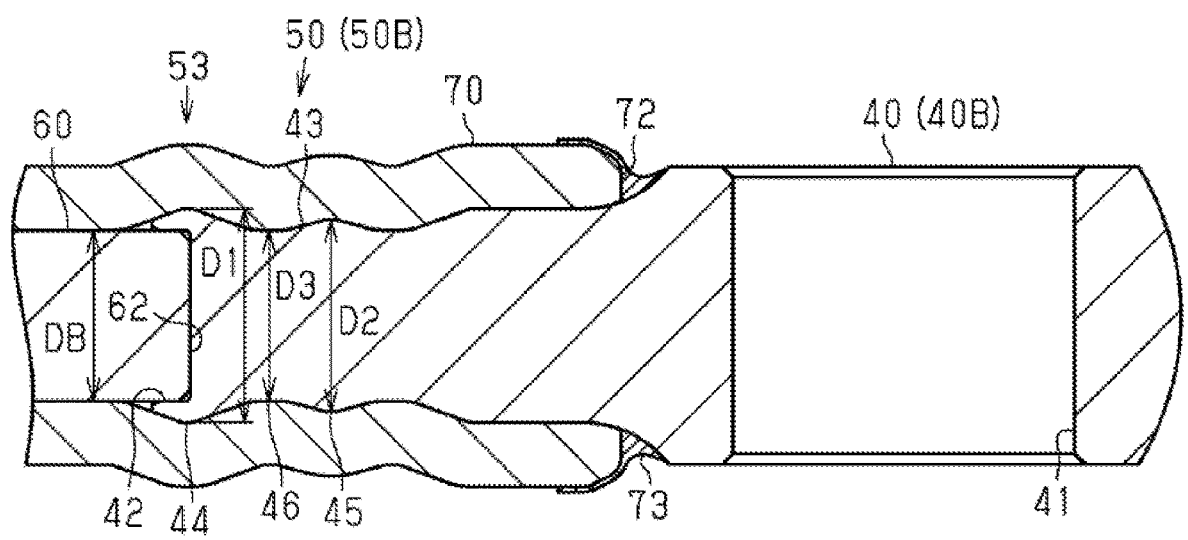
FIG. 7 illustrates a connecting portion between a second member on the right side of the joint structure related to the embodiment and a core shaft.

As shown in FIGS. 6 and 7, each of the first bush 40A and the second bush 40B is connected to a second end portion 62 of the core shaft 60 at the second connecting portion 53 and is covered with the covering member 70. A base end of the bush 40 has a recess 42 into which the second end portion 62 of the core shaft 60 is inserted. The second end portion 62 of the core shaft 60 is inserted into the recess 42 of the bush 40, and the bush 40 and the core shaft 60 are connected to each other. That is, the first bush 40A and the second bush 40B each covers at least partially the second end portion 62 of the core shaft 60.

An outer diameter DB of the second end 62 of the core shaft 60 is smaller than an outer diameter D1 of the first bush 40A and the second bush 40B (DB<D1). An outer peripheral surface of the bush 40 near the tip is provided with a wavy portion 43 formed in a wavy shape. Specifically, in the wavy portion 43 of the bush 40, a first ridge portion 44 and a second ridge portion 45 extending in the circumferential direction are formed. A recess 46 having an outer diameter D3 is formed between the first ridge portion 44 and the second ridge portion 45. An outer diameter D1 of the first ridge portion 44 is larger than an outer diameter D2 of the second ridge portion 45 (D1>D2). An outer diameter D3 of the recess 46 is smaller than the outer diameter D1 of the first ridge portion 44 and the outer diameter D2 of the second ridge portion 45 (D3<D2<D1). The covering member 70 is provided tightly on and along the outer surface of the bush 40 and the core shaft 60 without any gap. Therefore, even if the bush 40 is pulled, the covering member 70 is caught by the first ridge portion 44 and the second ridge portion 45 of the bush 40, and the core shaft 60 and the bush 40 remain connected to each other without using fasteners or the like. Even if the bush 40 is further pulled and the second ridge portion 45 comes off from the covering member 70, the covering member 70 is caught by the first ridge portion 44 to prevent the entire bush 40 from completely coming off from the covering member 70.

When the covering member 70 is made of a fiber reinforced plastic, moisture or the like may infiltrate the covering member 70 from a second end portion 72 of the covering member 70 near the bush 40 along the fibers by capillary action. To prevent this, the second end portion 72 of the covering member 70 is coated with a coating material 73 such as resin. By coating the second end portion 72 with the coating material 73, it is possible to prevent the infiltration of moisture and the like. The coating material 73 is applied to the second end portion 72 to fix the covering member 70 and the bush 40 thereto.

Figure 8:
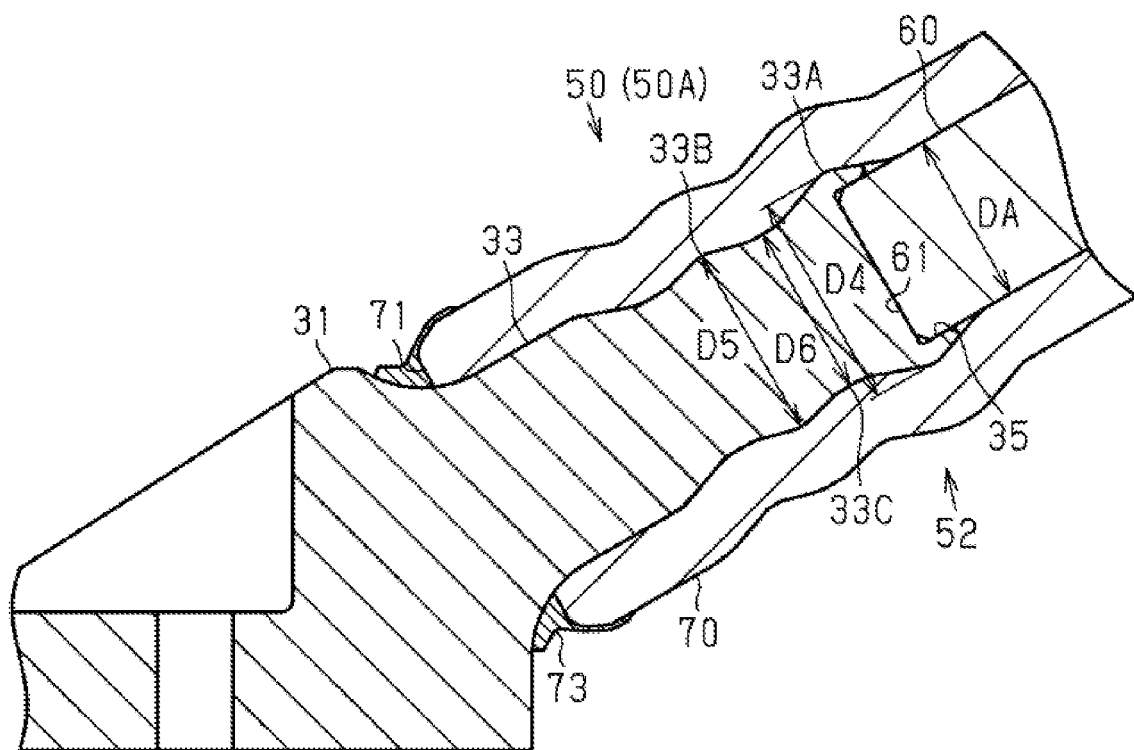
FIG. 8 illustrates a connecting portion between a first member on the left side of the joint structure related to the embodiment and a core shaft.
Figure 9:
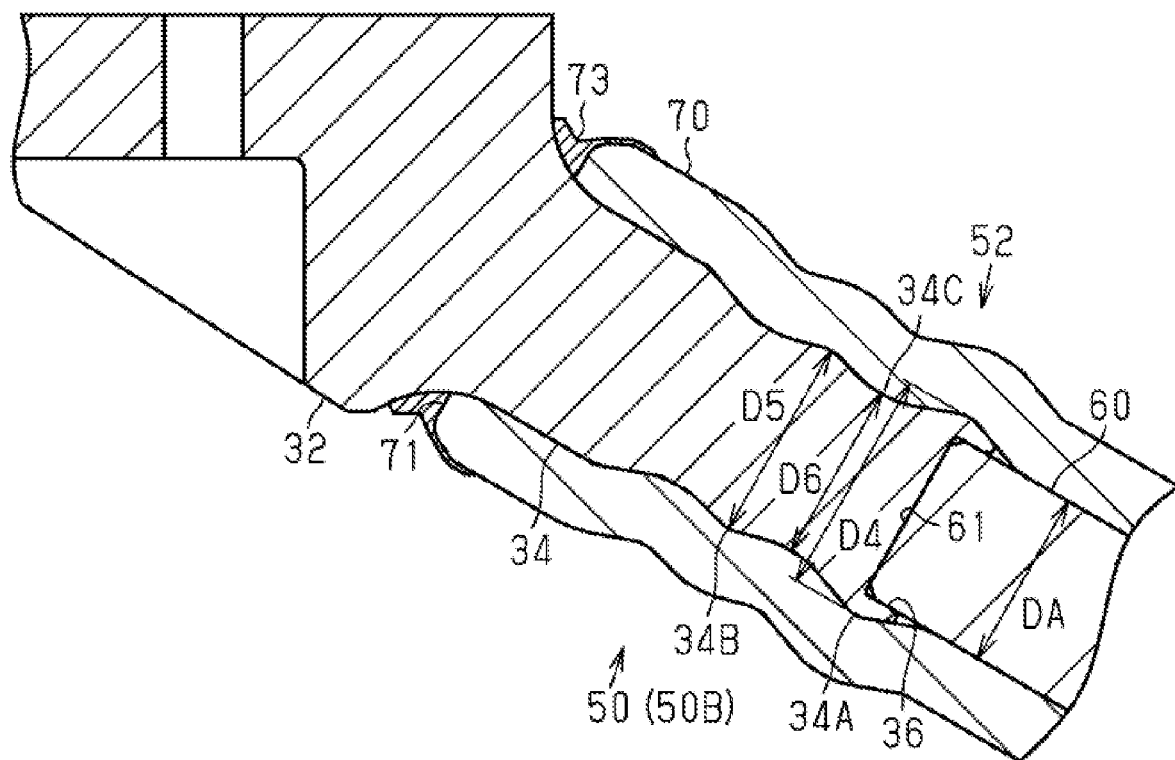
FIG. 9 illustrates a connecting portion between a first member on the right side of the joint structure related to the embodiment and a core shaft.

As shown in FIGS. 8 and 9, the first portion 31 and the second portion 32 of the head 30 are each connected to the first end portion 61 of the core shaft 60 at the first connecting portion 52 and covered with the covering member 70. The tip of the first arm portion 33 has a first recess 35 into which the first end portion 61 of the core shaft 60 is inserted. The first end portion 61 of the core shaft 60 is inserted in the first recess 35, which joints the first arm portion 33 and the core shaft 60. That is, the first portion 31 and the second portion 32 of the head 30 partially cover the first end portion 61 of the core shaft 60.

An outer diameter DA of the first end portion 61 of the core shaft 60 is smaller than an outer diameter D4 of the first arm portion 33 and the second arm portion 34 (DA<D4). An outer peripheral surface of the first arm portion 33 near the tip is provided with a wavy pattern. Specifically, the first ridge portion 33A and the second ridge portion 33B extending in the circumferential direction are formed on the outer peripheral surface of the first arm portion 33 near the tip. A recess 33C having an outer diameter D6 is formed between the first ridge portion 33A and the second ridge portion 33B. An outer diameter D4 of the first ridge portion 33A is larger than an outer diameter D5 of the second ridge portion 33B (D4>D5). An outer diameter D6 of the recess 33C is smaller than the outer diameter D4 of the first ridge portion 33A and the outer diameter D5 of the second ridge portion 33B (D6<D5<D4). The covering member 70 is provided tightly on and along the outer surface of the first arm portion 33 and the core shaft 60 without any gap. Therefore, even if the head 30 is pulled, the covering member 70 is caught by the first ridge portion 34A and the second ridge portion 34B of the head 30, and the core shaft 60 and the head 30 remain connected to each other without using fasteners or the like.

Even if the second ridge portion 33B is pulled further and comes off from the covering member 70, the covering member 70 is caught by the first ridge portion 33A to prevent the head 30 from completely coming off from the covering member 70. The tip of the second arm portion 34 has a second recess 36 into which the core shaft 60 is inserted. The core shaft 60 is inserted in the second recess 36, which connects the second arm portion 34 and the core shaft 60. An outer peripheral surface of the second arm portion 34 near the tip is provided with a wavy pattern. Specifically, the first ridge portion 34A and the second ridge portion 34B are formed on the outer peripheral surface of the second arm portion 34 near the tip. A recess 34C having an outer diameter D6 is formed between the first ridge portion 34A and the second ridge portion 34B. An outer diameter D4 of the first ridge portion 34A is larger than an outer diameter D5 of the second ridge portion 34B (D4>D5). An outer diameter D6 of the recess 34C is smaller than the outer diameter D4 of the first ridge portion 34A and the outer diameter D5 of the second ridge portion 34B (D6<D5<D4). The covering member 70 is provided tightly on and along the outer surface of the second arm portion 34 and the core shaft 60 without any gap. Therefore, even if the head is pulled further and the second ridge portion 34B comes off from the covering member 70, the covering member 70 is caught by the first ridge portion 34A to prevent the head 30 from completely coming off from the covering member 70.

When the covering member 70 is a fiber reinforced plastic, moisture or the like may infiltrate the covering member 70 from a first end portion 71 of the covering member 70 near the head 30 along the fibers by capillary action. To prevent this, the first end portion 71 of the covering member 70 is coated with the coating material 73 such as resin. By coating the first end portion 71 with the coating material 73, it is possible to prevent the infiltration of moisture and the like. The coating material 73 is applied to the first end portion 71 to fix the covering member 70 and the head 30 thereto. The resin used for the coating material 73 is preferably the same as the resin impregnated with the fibers of the fiber reinforced plastic because of its high affinity.

In the link main body 50, the head 30 and the bush 40 are connected by the core shaft 60 made of resin and the covering member 70 made of fiber reinforced plastic, so that it is possible to reduce the weight while ensuring the required strength.

Next, a method of manufacturing the reaction link 20 will now be described with reference to FIGS. 10 to 18.

Figure 10:
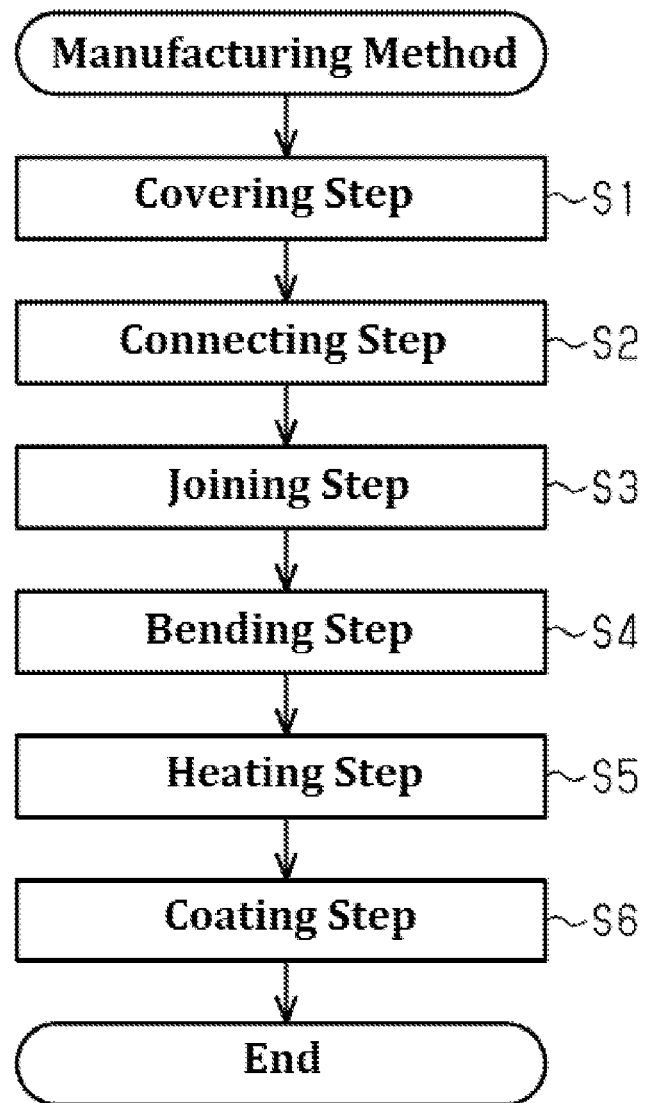
FIG. 10 is a flow chart showing a method of manufacturing the joint structure related to the embodiment.

As shown in FIG. 10, the manufacturing method of the reaction link 20 includes a covering step (step S1), a connecting step (step S2), a joining step (step S3), a bending step (step S4), a heating step (step S5), and a coating step (step S6).

Figure 11:
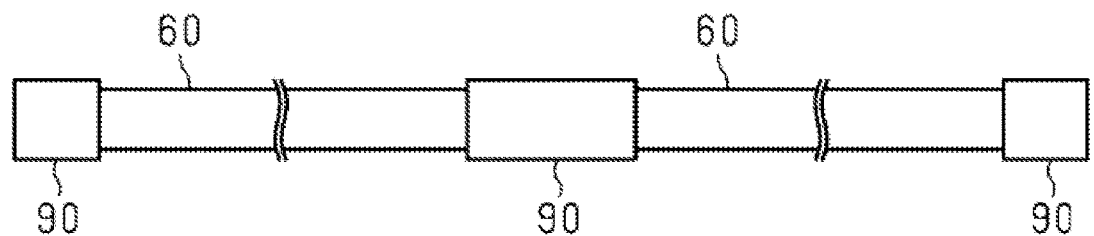
FIG. 11 illustrates a state in which the core shafts of the embodiment are connected to each other with a connecting jig.

As shown in FIG. 11, two or more core shafts 60 are connected to each other by connecting jigs 90. The connecting jig 90 is further provided at each end of the core shaft 60. By doing so, it is possible to collectively perform the covering work onto the two or more core shafts 60. Not limited to the two core shafts 60, three or more core shafts 60 may be connected by the connecting jigs 90.

Figure 12:
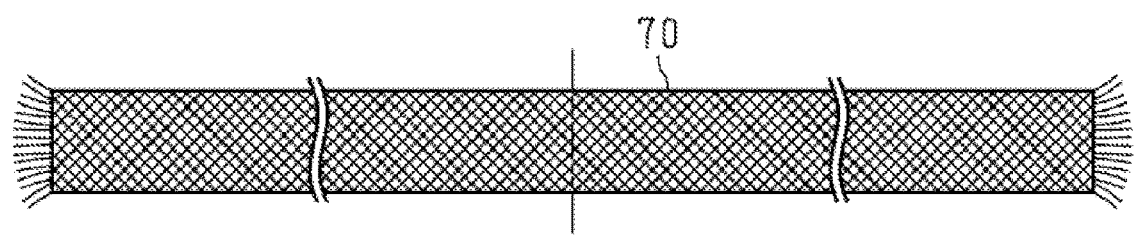
FIG. 12 illustrates a state in which the core shaft of the embodiment is covered with a covering member and illustrates a cut portion of the cure shaft.

As shown in FIG. 12, in the following covering step of step S1, the plurality of the core shafts 60 connected by the connecting jigs 90 are covered with the covering member 70. The covering member 70 is wound not only around the core shafts 60 but also around the connecting jigs 90 in layers. Specifically, an impregnation fluid tank containing a thermosetting resin (e.g., unsaturated polyester) as an impregnation fluid is first prepared. Then, fibers extending from a winding machine (not shown) may be soaked into the impregnation fluid tank. The winding machine is used for winding the fibers around the core shafts 60. As for the impregnation fluid, the unsaturated polyester may be replaced with, e.g., an epoxy resin, a polyamide resin, or a phenol resin. The thermosetting resin may be replaced with, e.g., a UV-curable resin, a light curable resin, a thermoplastic resin (e.g., methyl methacrylate). The fibers impregnated with the thermosetting resin are woven together and wound around the core shafts 60 by the winding machine. The fibers are wound in two layers around the first connecting portion 52, the core shaft 60, and the second connecting portion 53. In the covering step, the link main body 50 is formed. The fibers are exposed at both ends of the covering member 70.

Figure 13:
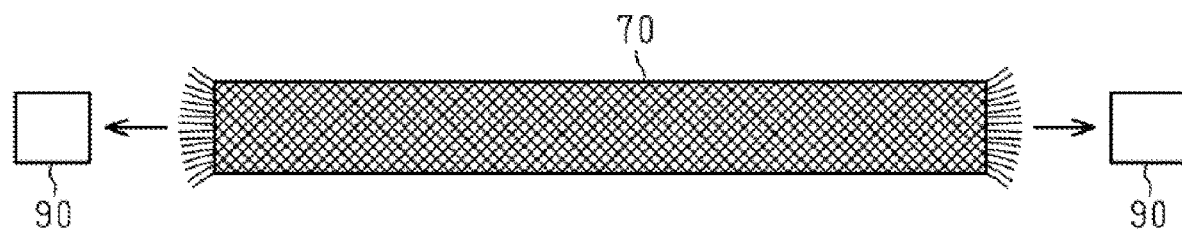
FIG. 13 illustrates a state in which the connecting jig is removed from the core shaft covered with the covering member related to the embodiment.

Subsequently, as shown in FIG. 12, the covering member 70 is cut at the portions of the connecting jigs 90 that connect the core shafts 60 to each other. Cutting may be performed only to the covering member 70. Alternatively, the connection jig 90 may also be cut. As shown in FIG. 13, the connection jig 90 at each end of the core shaft 60 is removed.

Figure 14:
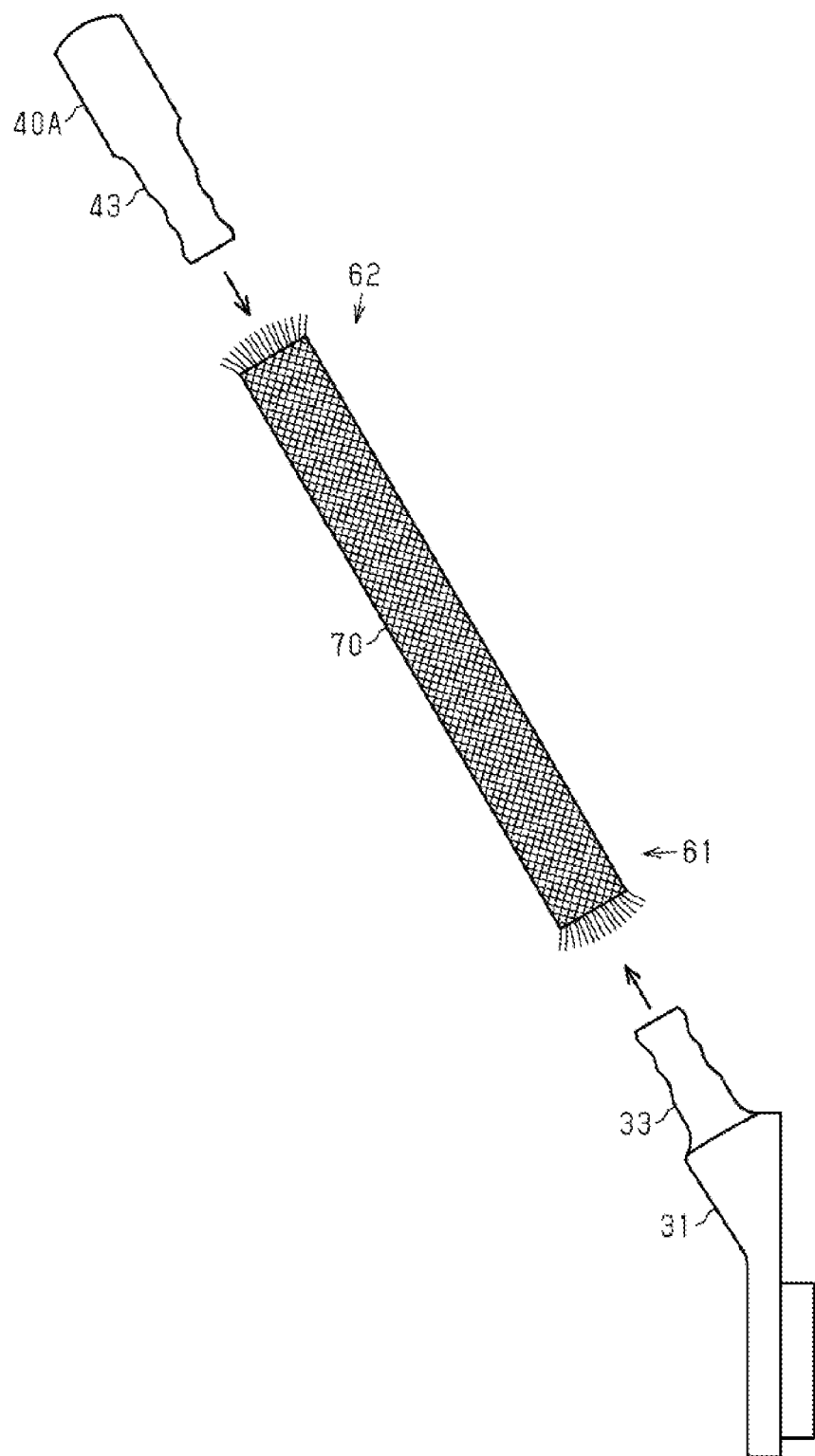
FIG. 14 illustrates a state in which a first member and a second member are connected to a left core shaft covered with the covering member relates to the embodiment.
Figure 15:
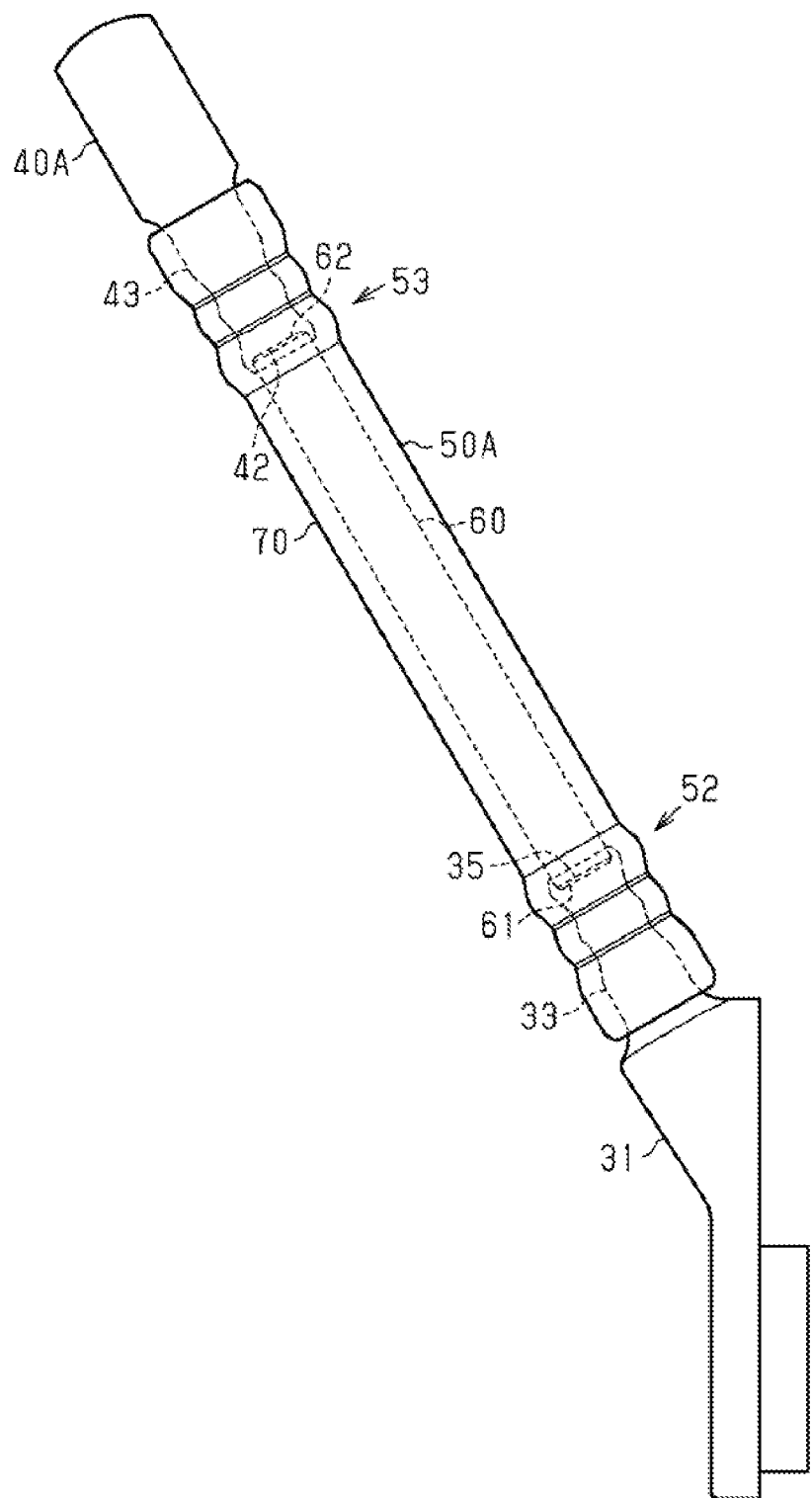
FIG. 15 illustrates a connected state between the first member, the second member, and a link main body on the left side of the joint structure related to the embodiment.

Subsequently, as shown in FIGS. 14 and 15, in the connecting step of step S2, the first portion 31 of the head 30 is inserted into the tube formed of the covering member 70 that covers the core shaft 60. Then, the first portion 31 of the head 30 is connected to the first end portion 61 of the core shaft 60. At the first connecting portion 52, the first end portion 61 of the core shaft 60 is inserted into the first recess 35 of the first arm portion 33 of the head 30. The first bush 40A is inserted into the tube formed of the covering member 70 that covers the core shaft 60. The first bush 40A is connected to the second end portion 62 of the core shaft 60. At the second connecting portion 53, the second end portion 62 of the core shaft 60 is inserted into the recess 42 of the first bush 40A. As discussed above, the covering member 70 is wound in layers to cover from the first arm portion 33 of the first portion 31 to the wavy portion 43 of the first bush 40A.

Figure 16:
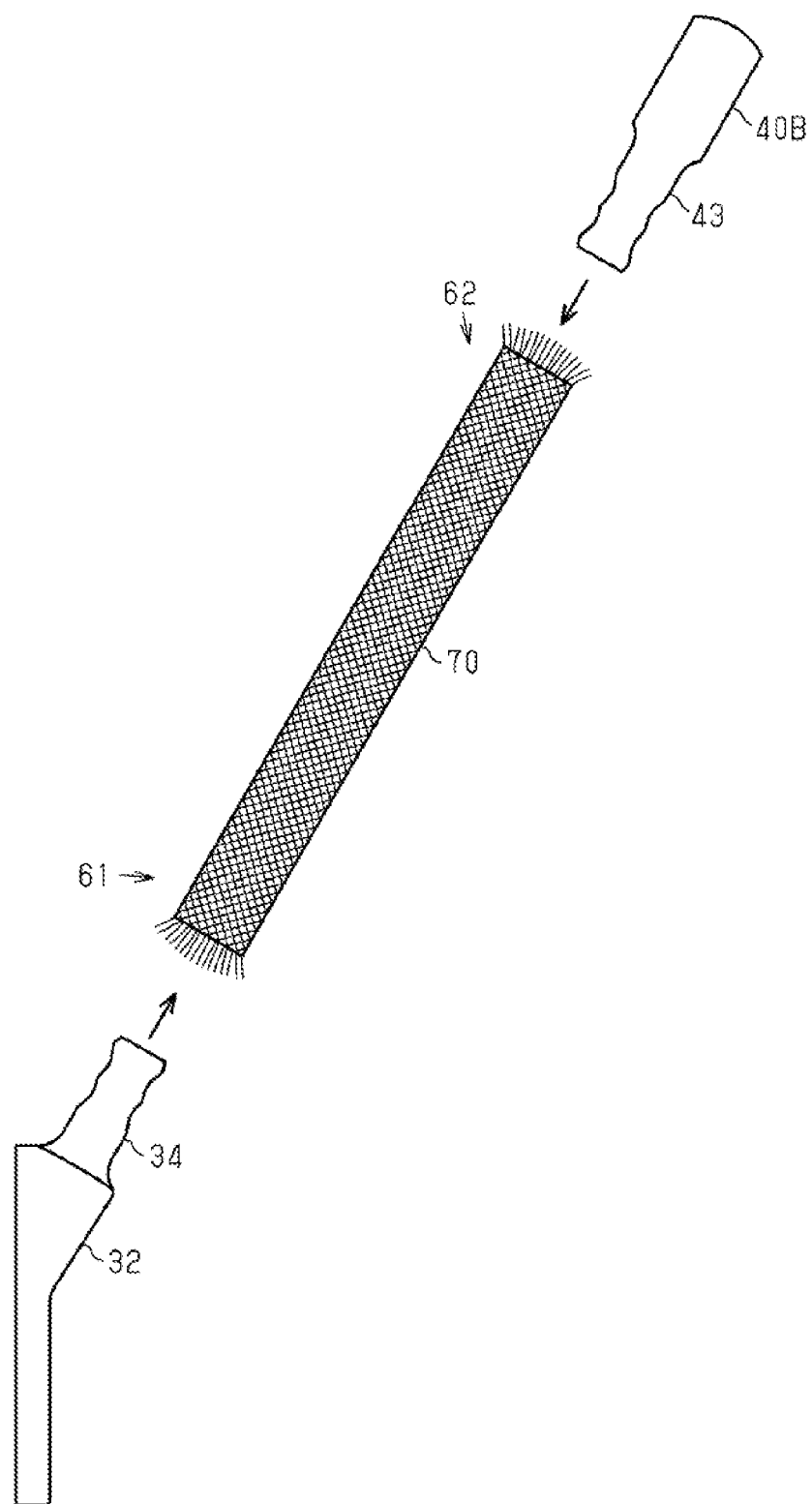
FIG. 16 illustrates a state in which the first member and the second member are connected to a right core shaft covered with the covering member relates to the embodiment.
Figure 17:
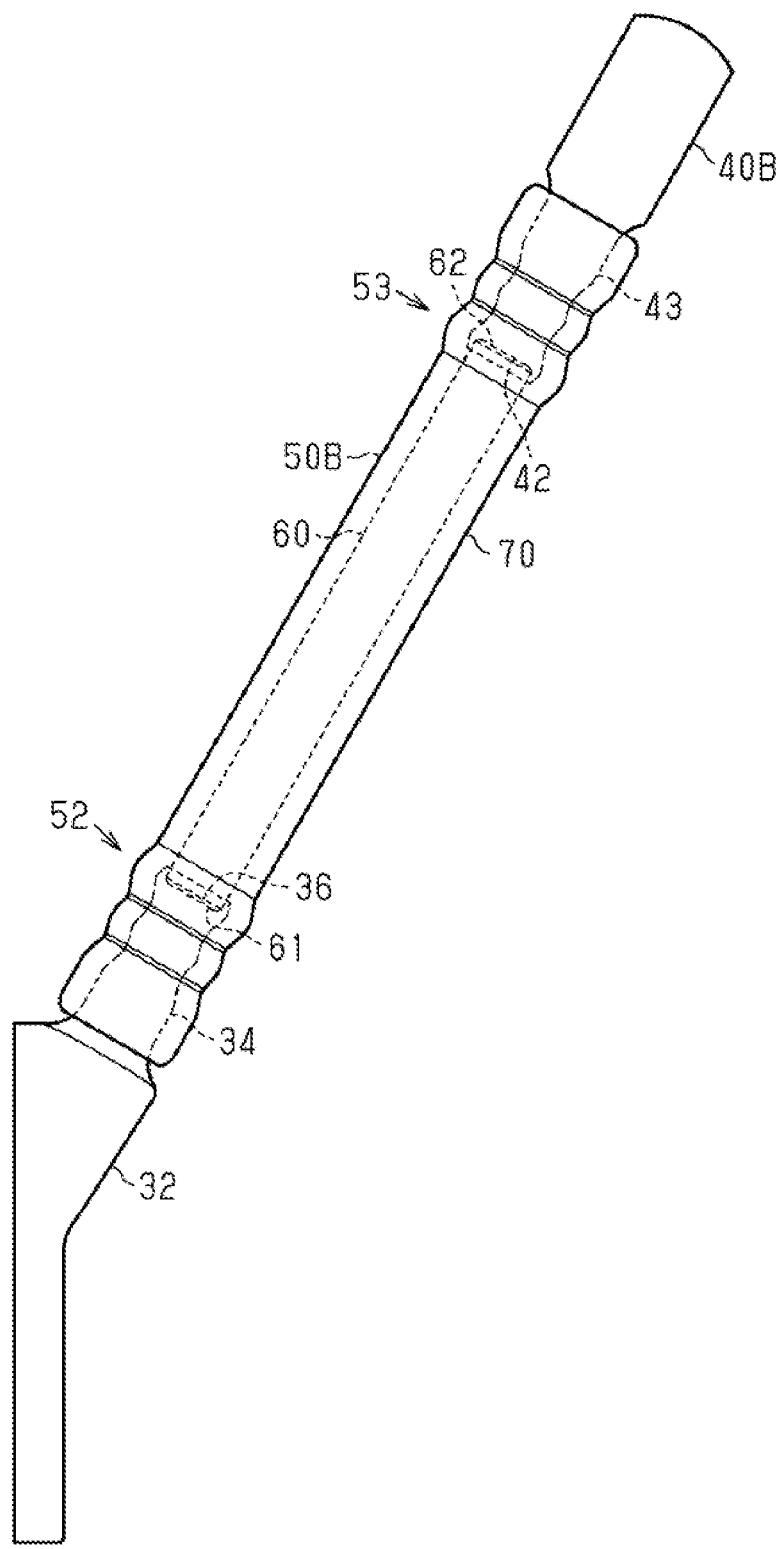
FIG. 17 illustrates a connected state between the first member, the second member, and the link main body on the right side of the joint structure related to the embodiment.

Subsequently, as shown in FIGS. 16 and 17, in the connecting step of step S2, the second portion 32 of the head 30 is inserted into the tube formed of the covering member 70 that covers the core shaft 60. Then, the second portion 32 of the head 30 is connected to the first end portion 61 of the core shaft 60. At the first connecting portion 52, the first end portion 61 of the core shaft 60 is inserted into the second recess 36 of the second arm portion 34 of the head 30. The second bush 40B is inserted into the tube formed of the covering member 70 that covers the core shaft 60. The second bush 40B is connected to the second end portion 62 of the core shaft 60. At the second connecting portion 53, the second end portion 62 of the core shaft 60 is inserted into the recess 42 of the second bush 40B. As discussed above, the covering member 70 is wound in layers from the second arm portion 34 of the second portion 32 to the wavy portion 43 of the second bush 40B.

Subsequently, as shown in FIGS. 4 and 5, in the joining step of step S3, the first portion 31 and the second portion 32 of the head 30 are joined to each other. Specifically, the joining convex portion 37A of the first portion 31 is fitted into the joining concave portion 37B of the second portion 32. The first portion 31 and the second portion 32 are then screwed to be fastened to each other.

Figure 18:
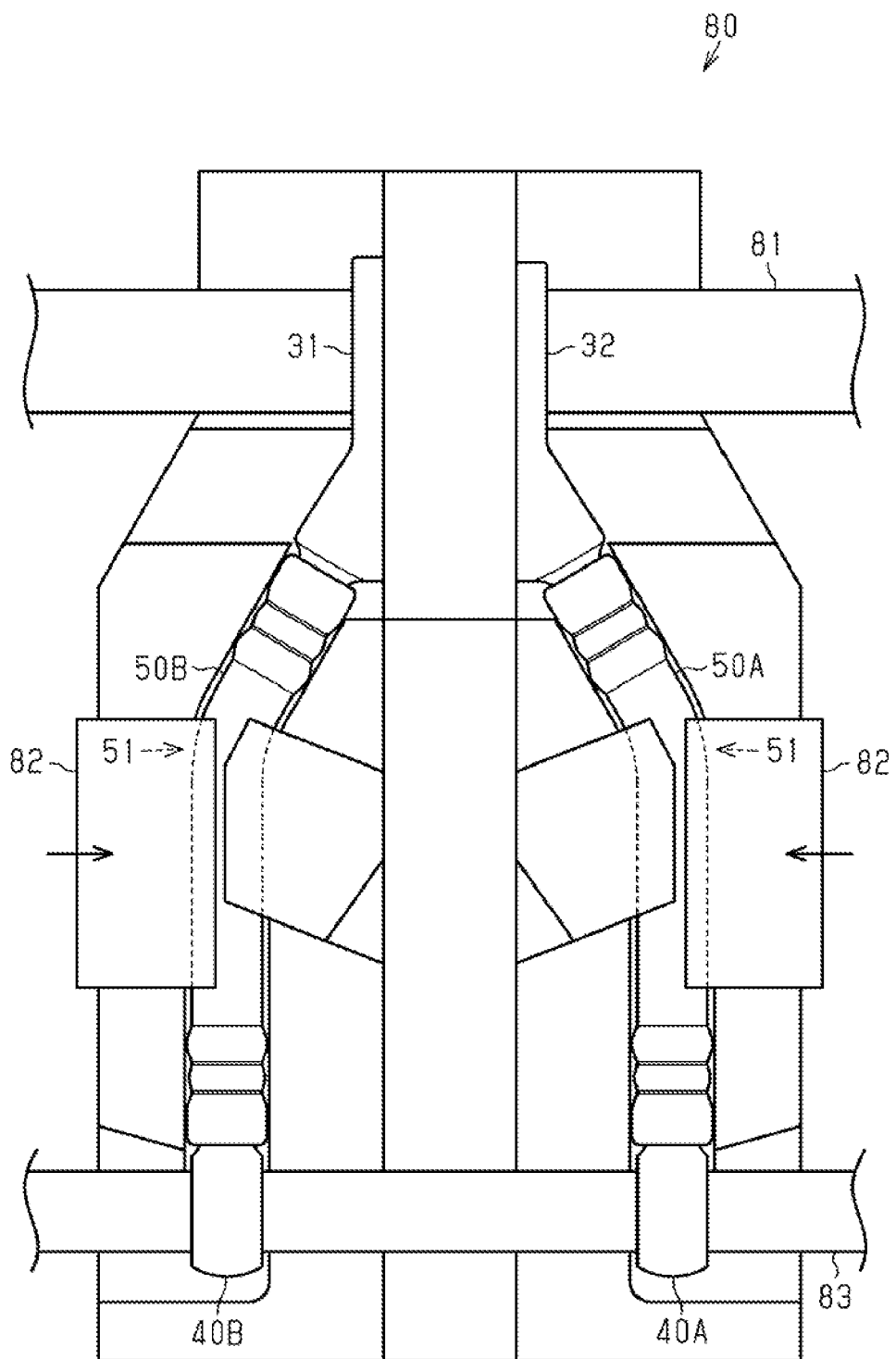
FIG. 18 illustrates a state in which the link main body of the joint structure related to the embodiment is bent by a jig.

Subsequently, as shown in FIG. 18, in the bending step of step S4, the head 30, the core shaft 60, and the bush 40 covered with the covering member 70 are placed on a jig 80. The core shaft 60 is bent at a position different from the first connecting portion 52 between the head 30 and the core shaft 60. Specifically, a head fixing shaft 81 for fixing the head 30 is inserted through the through hole portion 38 of the head 30, and the position of the head 30 is fixed. The reaction link 20 is placed on the jig 80 in a state where the link main body 50 extends in a straight line form as shown in FIGS. 15 and 17. Then, a bent portion fixing member 82 bends the link main body 50 by pressing the central portion of the link main body 50. The bent portion fixing member 82 pushes the link main body 50 to a position where the pair of link main bodies 50 extend parallel to each other and fixes them at that position. When the pair of link main bodies 50 become parallel to each other, a bush fixing shaft 83 is inserted through the through holes 41 of both bushes 40 to fix the pair of bushes 40 at that position. Here, the position where the link main body 50 bends is different from the position of the first connecting portion 52 between the head 30 and the core shaft 60. Thus, it is possible to prevent the fiber reinforced plastic, which is the covering member 70, from creasing. This creasing prevention way is particularly effective when the first connecting portion 52 is provided with the wavy pattern that prevents the component from coming off.

As shown in FIG. 18, in the heating step of step S5, the covering member 70 is cured by heating. The reaction link 20 fixed to the jig 80 is placed in a vacuum chamber and heated. The covering member 70 is cured by heating. When an ultraviolet curable resin is used instead of the thermosetting resin as the impregnating fluid, the resin impregnated in the fibers is cured by irradiating the link main body 50 with ultraviolet rays in the heating step.

Subsequently, as shown in FIG. 4, in the coating step of step S6, the coating material 73 is applied to the head 30 and the bush 40 so as to cover the first end portion 71 and the second end portion 72 of the covering member 70.

The action of the reaction link 20 will now be described with reference to FIG. 2.

As shown in FIG. 2, when a reaction force produced when the actuator 10 drives the flight control surface 101 is imparted to the actuator 10, the bush 40 may be subjected to a tensile load, a compressive load, or a torsional load via the shaft 13A connecting between the actuator 10 and the reaction link 20. The covering member 70 covers the first connecting portion 52 and the second connecting portion 53. Further, the covering member 70 is wound around the link main body 50 continuously from the head 30 to the bush 40. Thus, the covering member 70 receives a force when a tensile load, a compressive load, or a torsional load is applied to the bush 40. Therefore, the weight of the link main body 50 can be reduced while maintaining the strength required for the reaction link 20. Further, even if water drops on the reaction link 20 due to a change in atmospheric pressure or the like, the end portion of the covering member 70 is covered with the coating material 73, so that it is possible to prevent water or the like from entering into the covering member 70. At the through hole portion 38 of the head 30, only the joining convex portion 37A of the first portion 31 contacts the shaft 13A of the connecting portion 13, and the joining convex portion 37A contacts the joining concave portion 37B. Therefore, even if the first portion 31 or the second portion 32 of the head 30 and the core shaft 60 are broken, the connected state between the head 30 and the shaft 13A can be maintained and the load support can be maintained.

The following describes advantageous effects of the embodiment.

(1) The first connecting portion 52 between the head 30 and the core shaft 60 is situated a position different from the position of the bent portion 51 of the reaction link 20. Thus, the joint portion is not bent when the core shaft 60 is bent, and thereby it is possible to reduce the chance of formation of crease in the covering member 70 that covers the bent portion 51.

(2) A bendable material can be selected for the core shaft 60 that has the bent portion 51, and a high-strength material can be selected for the head 30 and the bush 40, which require strength.

(3) The head 30 can separate into the first portion 31 and the second portion 32. Thus, the first portion 31 and the second portion 32 are separately joined to the corresponding core shaft 60 and the corresponding bush 40 and then they are fixed to each other by the covering member 70. Thereafter, the first portion 31 and the second portion 32 can be combined. In this way, the head 30, the core shaft 60, and the bush 40 can be easily placed on a tool such as the jig.

(4) Since the first portion 31 and the second portion 32 of the head 30 are connected by the fitting structure at the joining portion 37, the withstand load of the head 30 can be increased as compared with the case where there is no fitting structure.

(5) Of the head 30, only the first portion 31 comes into contact with the fulcrum shaft 104. Therefore, the load applied from the fulcrum shaft 104 can be supported only by the first portion 31 of the head 30, and even if the head 30 is separated into the first portion 31 and the second portion 32, the change in the load can be small.

OTHER EMBODIMENTS

The foregoing embodiments can be modified as described below. The above embodiment and the following modifications can be implemented in combination to the extent where they are technically consistent to each other.

In the above embodiment, the first end portion 71 of the covering member 70 is coated with the coating material 73 such as resin. Alternatively, the first end portion 71 of the covering member 70 may not be covered with a coating material such as resin.

In the above embodiment, the second end portion 72 of the covering member 70 is coated with the coating material 73 such as resin. Alternatively, the second end portion 72 of the covering member 70 may not be covered with a coating material such as resin.

In the above embodiment, the head 30 covers the core shaft 60 at least partially. Alternatively, the head 30 may not cover the core shaft 60.

In the above embodiment, the bush 40 covers the core shaft 60 at least partially. Alternatively, the bush 40 may not cover the core shaft 60.

In the above embodiment, two ridges, that is, the first ridge 33A or 34A and the second ridge 33B or 34B are provided on the outer peripheral surface of the head 30. Alternatively, three or more ridges may be provided on the outer peripheral surface of the head 30. The outer diameter of these ridges may increase toward the tip of the head 30. Alternatively, only one ridge may be provided on the outer peripheral surface of the head 30.

In the above embodiment, two ridges, that is, the first ridge 44 and the second ridge 45 are provided on the outer peripheral surface of the bush 40. Alternatively, three or more ridges may be provided on the outer peripheral surface of the bush 40. The outer diameter of these ridges may increase toward the tip of the bush 40.

Alternatively, only one ridge may be provided on the outer peripheral surface of the bush 40.

In the above embodiment, the shape and outer diameter of the second connecting portion 53 are the same between the first bush 40A and the second bush 40B. Alternatively, at least one of the shape or the outer diameter of the second connecting portion 53 may be made different between the first bush 40A and the second bush 40B.

In the above embodiment, the shape and outer diameter of the first connecting portion 52 are the same between the first arm portion 33 and the second arm portion 34. Alternatively, at least one of the shape or the outer diameter of the first connecting portion 52 may be made different between the first arm portion 33 and the second arm portion 34.

Figure 19:
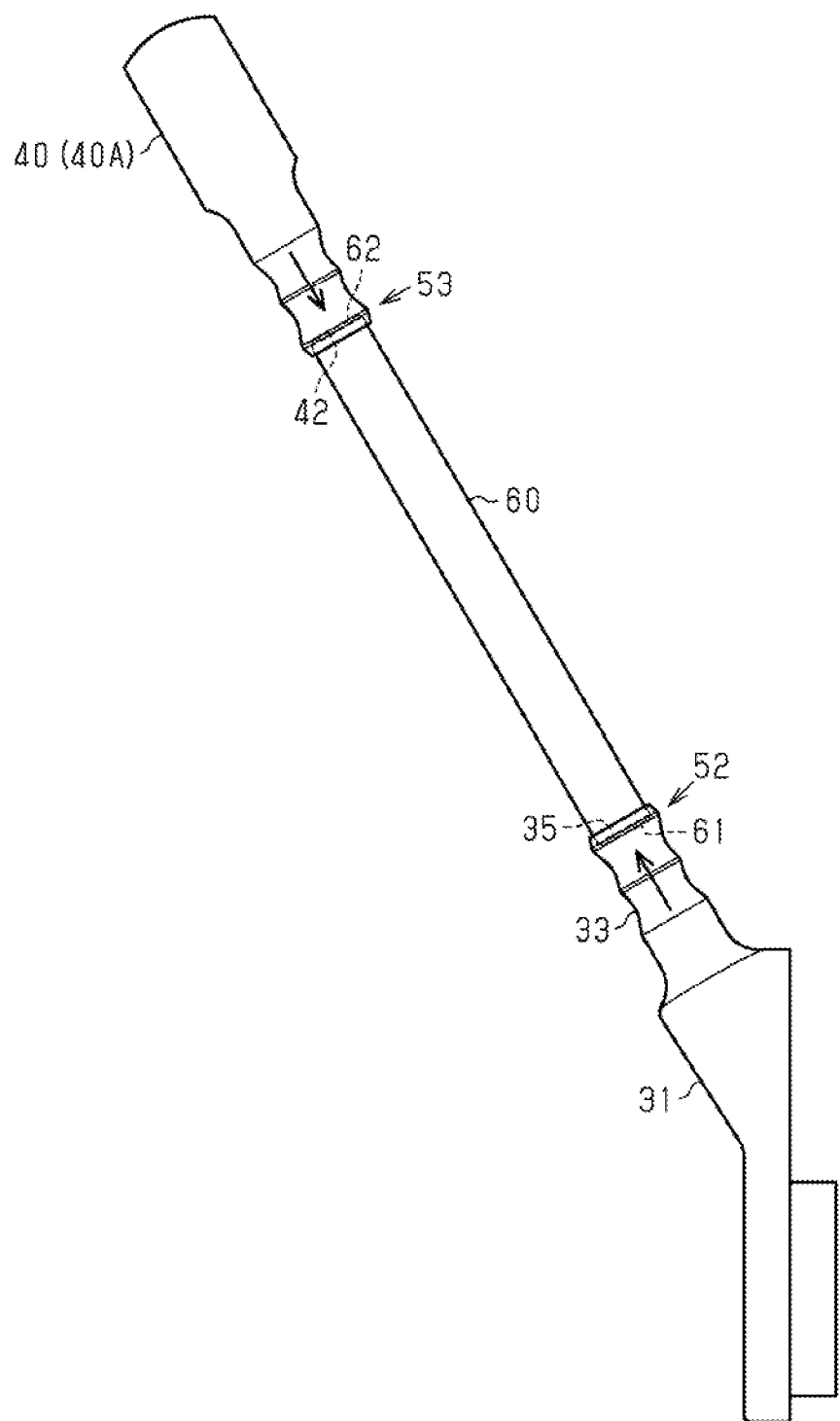
FIG. 19 illustrates a connected state between the first member, the second member, and the core shaft on the left side of the joint structure of the modified example.
Figure 20:
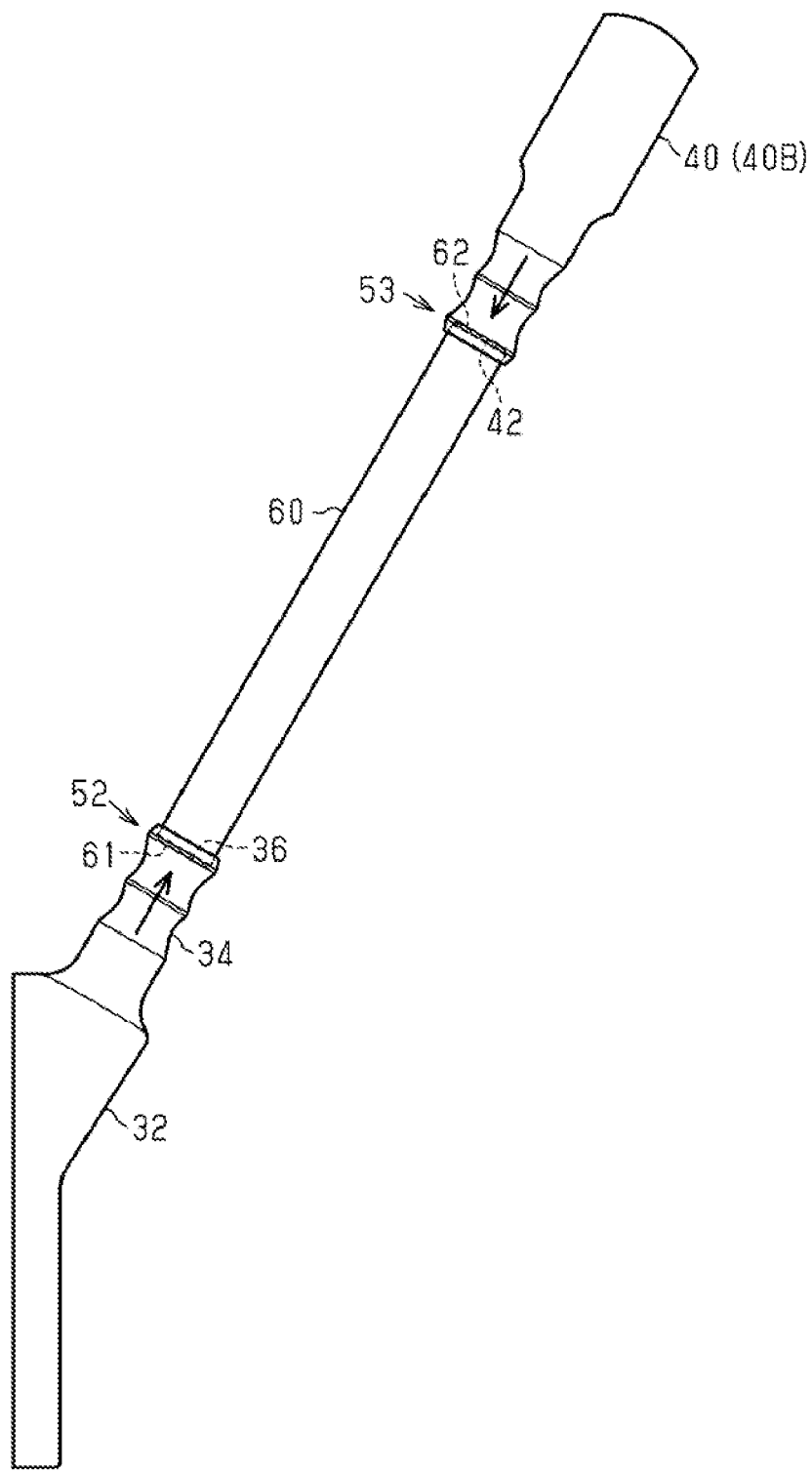
FIG. 20 illustrates a connected state between the first member, the second member, and the core shaft on the right side of the joint structure of the modified example.

In the above embodiment, after the covering step (step S1) of covering the core shaft 60 with the covering material 70, the connecting step (step S2) of connecting the head 30 and the bush 40 to the link main body 50 is performed. Alternatively, after the connecting step (new step S1) of connecting the head 30 and the bush 40 to the core shaft 60, the covering step (new step S2) of covering the core shaft 60, the head 30, and the bush 40 with the covering material 70 may be performed. The joining step of the head 30 is performed after the covering step. That is, as shown in FIGS. 19 and 20, in the connecting step of step S1, the first portion 31 of the head 30 is connected to the first end portion 61 of the core shaft 60. At the first connecting portion 52, the first end portion 61 of the core shaft 60 is inserted into the first recess 35 of the first arm portion 33 of the head 30. The first bush 40A is connected to the second end portion 62 of the core shaft 60. At the second connecting portion 53, the second end portion 62 of the core shaft 60 is inserted into the recess 42 of the first bush 40A. Subsequently, as shown in FIGS. 15 and 17, in the covering step of step S2, the first connecting portion 52 between the head 30 and the core shaft 60 and the second connecting portion 53 between the bush 40 and the core shaft 60 are covered with the covering member 70. As discussed above, the covering member 70 is wound in layers from the first arm portion 33 of the first portion 31 to the wavy portion 43 of the first bush 40A. Similarly, the covering member 70 is wound in layers from the second arm portion 34 of the second portion 32 to the wavy portion 43 of the second bush 40B.

In the above embodiment, the shape of the ridge portion may have any shape such as a semicircle cross section, a square cross section, and a triangle cross section. Further, convex or hemisphere patterns may be provided on the outer periphery of the head 30 and the bush 40 at intervals.

Only the first portion 31 of the head contacts the fulcrum shaft 104 in the above embodiment. Alternatively, only the second portion 32 contacts the fulcrum shaft 104. Alternatively, both the first portion 31 and the second portion 32 may contact the fulcrum shaft 104.

In the above embodiment, the first portion 31 and the second portion 32 of the head 30 are joined by the fitting structure at the joining portion 37. Alternatively, the joining portion 37 may not have the fitting structure.

In the above embodiment, the head 30 is configured to be separated into the first portion 31 and the second portion 32. Alternatively, the first portion 31 and the second portion 32 may be integrated and form a single body.

In the above embodiment, the head 30 and the bush 40 are made of a material(s) different from that of the core shaft 60. Alternatively, the head 30, the bush 40, and the core shaft 60 may be made of the same material.

In the above embodiment, the first member rotatably connected to the mating member and the second member rotatably connected to the actuator for driving the mating member may be any members other than the head 30 and the bush 40.

In the above embodiment, the fibers may be wound around the core shaft 60 in the coating step and then impregnated in the impregnating liquid tank. Alternatively, to impregnate the resin, the fibers may be sprayed with a thermosetting resin, a UV-curable resin, a light curable resin, or a thermoplastic resin, instead of being soaked into the fluid tank.

The foregoing embodiments describe a plurality of physically separate constituent parts. They may be combined into a single part, and any one of them may be divided into a plurality of physically separate constituent parts. Irrespective of whether or not the constituent parts are integrated, they are acceptable as long as they are configured to solve the problems.

What is claimed is:

1. A joint structure, comprising:
   a bent portion;
   a first member configured to be connected rotatably to a mating member;
   a second member configured to be connected rotatably to an actuator for driving the mating member;
   a core shaft having a first connecting portion and a second connecting portion, the core shaft being connected to the first member at the first connecting portion and connected to the second member at the second connecting portion; and
   a covering member covering the first connecting portion and the second connecting portion,
   wherein the bent portion is provided at a position different from the first connecting portion,
   wherein the core shaft is one of a pair of the core shafts, the second member is one of a pair of the second members, and the covering member is one of a pair of the covering members,
   wherein the first member has a first portion including a first arm portion and a second portion including a second arm portion, the first member bifurcates into the first arm portion and the second arm portion, and
   wherein the first arm portion and the second arm portion are each connected to a corresponding one of the pair of core shafts and a corresponding one of the pair of second members, and is fixed by the corresponding one of the pair of covering members.

2. The joint structure of claim 1, wherein a material of the core shaft is different from a material of the first member and a material of the second member.

3. The joint structure of claim 1, wherein the first member is configured such that a rotation shaft provided on the mating member penetrates a joining portion between the first portion and the second portion, and only one of the first portion or the second portion contacts the rotation shaft.

4. The joint structure of claim 3, wherein the first portion and the second portion are joined together by a fitting structure at the joining portion.

5. A method of manufacturing a joint structure that includes a first member configured to be connected rotatably to a mating member, a second member configured to be connected rotatably to an actuator for driving the mating member, a core shaft having a first end portion and a second end portion, and a covering member covering the first connecting portion and the second connecting portion, the method comprising:
  covering the core shaft with the covering member;
  after the covering, connecting the first member to the first end portion and connecting the second member to the second end portion;
  placing the first member, the core shaft, and the second member on a jig and bending the core shaft at a position different from the first portion; and
  heating the covering member to cure.

6. The method of claim 5, wherein the core shaft is one of a pair of the core shafts, the second member is one of a pair of the second members, and the covering member is one of a pair of the covering members,
  wherein the first member has a first portion including a first arm portion and a second portion including a second arm portion, the first member bifurcates into the first arm portion and the second arm portion,
  wherein the first arm portion and the second arm portion are each connected to a corresponding one of the pair of core shafts and a corresponding one of the pair of second members,
  wherein the method further comprising joining the first portion and the second portion together after the connecting.

* * * * *